United States Patent
Dimou et al.

(10) Patent No.: US 8,948,759 B2
(45) Date of Patent: Feb. 3, 2015

(54) METHOD AND ARRANGEMENT IN WIRELESS COMMUNICATIONS NETWORK

(75) Inventors: Konstantinos Dimou, Stockholm (SE); Yu Yang, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 47 days.

(21) Appl. No.: 13/255,028

(22) PCT Filed: Mar. 23, 2009

(86) PCT No.: PCT/SE2009/050302
§ 371 (c)(1),
(2), (4) Date: Sep. 6, 2011

(87) PCT Pub. No.: WO2010/110705
PCT Pub. Date: Sep. 30, 2010

(65) Prior Publication Data
US 2012/0094670 A1    Apr. 19, 2012

(51) Int. Cl.
*H04W 36/00* (2009.01)
*H04W 28/06* (2009.01)

(52) U.S. Cl.
CPC .......... *H04W 36/0083* (2013.01); *H04W 28/06* (2013.01)
USPC ..... 455/436; 455/442; 455/435.1; 455/432.1; 455/422.1; 370/331

(58) Field of Classification Search
CPC ...... H04W 36/30; H04W 36/18; H04W 36/08
USPC ................ 455/436, 442, 435.1, 432.1, 422.1; 370/331
See application file for complete search history.

(56) References Cited

U.S. PATENT DOCUMENTS

| | | | | |
|---|---|---|---|---|
| 7,499,700 | B2* | 3/2009 | Dillon et al. | 455/423 |
| 7,881,251 | B2* | 2/2011 | Hovey | 370/328 |
| 2008/0192925 | A1* | 8/2008 | Sachs et al. | 380/29 |
| 2008/0205345 | A1* | 8/2008 | Sachs et al. | 370/332 |
| 2009/0131053 | A1* | 5/2009 | Sachs et al. | 455/436 |

FOREIGN PATENT DOCUMENTS

| | | |
|---|---|---|
| EP | 1887739 A | 2/2008 |
| WO | 99/43178 A | 8/1999 |

(Continued)

OTHER PUBLICATIONS

International Search Report for International Application No. PCT/SE2009/050302 mailed Nov. 26, 2009.

(Continued)

*Primary Examiner* — Nghi H Ly
(74) *Attorney, Agent, or Firm* — Patent Portfolio Builders PLLC (57) ABSTRACT

A method in a wireless terminal (110) for sending a measurement report to a serving base station (130) before handover is provided. The wireless terminal (110) and the base station (130) are comprised in a cell in a wireless communications system. The wireless terminal (110) is arranged to use a standard size message or a reduced size message for sending a measurement report before a handover. The wireless terminal (110) obtains (601) information about the cell size and/or the system load. When the cell size exceeds a predetermined value or when the system load exceeds a predetermined value, the wireless terminal (110) sends (605) a measurement report to the base station (130), using the reduced size message.

32 Claims, 6 Drawing Sheets

(56) References Cited

FOREIGN PATENT DOCUMENTS

| WO | 03/017539 A | 2/2003 |
| WO | 2008/115116 A | 9/2008 |

OTHER PUBLICATIONS

International Preliminary Report of Patentability in corresponding PCT Application No. PCT/SE2009/050302 issued on Sep. 27, 2011.

* cited by examiner

METHOD AND ARRANGEMENT IN WIRELESS COMMUNICATIONS NETWORK

TECHNICAL FIELD

The present invention relates to a method and an arrangement in a wireless terminal and a method and an arrangement in a base station. In particular, it relates to adapting size of a measurement report in handover.

BACKGROUND

In a typical cellular radio system, also referred to as a wireless communication system, wireless terminals, also known as mobile stations and/or User Equipment units (UEs) communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-included, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "eNodeB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies which is denoted Evolved Universal Terrestrial Radio Access Network E-UTRAN also referred to the 3GPP work item on the Long Term Evolution (LTE).

In mobile communications, when a wireless terminal is in connected mode and travels through a radio access network, the wireless terminal is served by different cells in the course of the travel. That is, as a wireless terminal travels through the radio access network, the wireless terminal is typically handed over, e.g., from one cell to another cell, through a handover procedure. This involves large number of "mobility parameters", which should be properly tuned and optimized to ensure robust mobility performance.

Downlink Measurements for Mobility User equipment unit mobility primarily relies on downlink measurements. Downlink measurements used in various systems are described below:

In WCDMA the following three downlink radio related measurements are specified primarily for mobility reasons:
(1) Common Pilot CHannel Received Signal Code Power (CPICH RSCP);
(2) CPICH Ec/No, this is basically the signal-to-noise ratio used for representing the "cell quality" for handover evaluation;
(3) UTRA Carrier Received Signal Strength Indicator (RSSI).

The first two of the above measurements are performed by the user equipment unit on cell level basis on the Common Pilot CHannel (CPICH). The UTRA carrier RSSI is measured over the entire carrier. The above CPICH measurements are the main quantities used for the mobility decisions. In addition, in WCDMA several timing related measurements are also specified for connected mode mobility procedure. They are used to adjust the user equipment timing when performing handover in connected mode.

In E-UTRAN the following three downlink quality measurements are specified primarily for mobility reasons:
(1) Reference Symbol Received Power (RSRP);
(2) Reference Symbol Received Quality (RSRQ);
(3) E-UTRA Carrier RSSI.

The first two of the above measurements are performed by the user equipment on cell level basis on reference symbols. As in case of WCDMA, the E-UTRA carrier RSSI is measured over the entire carrier. The two RS based measurements are indeed also the main quantities, which are likely to be used for the mobility decisions.

Handover Evaluation Processes

Handover is controlled by the network through explicit UE specific commands and by performance specification. In connected mode the UE regularly performs measurements on neighbor cells. The network configures the UE to report events associated with mobility when certain conditions are fulfilled, e.g., when neighbour cell becomes stronger than the serving cell by some margin, i.e. hysteresis, over certain time, i.e., time hysteresis. The UE reports events and/or measurement report to the network, which in turn makes an appropriate decision, e.g. sends a handover command to the UE. Typical connected mode mobility parameters are a layer-3 or higher layer filtering coefficient for additional time domain filtering, time to trigger (time hysteresis), and hysteresis (for signal).

It is very important the handover process is successful, since if the handover failures it may lead to a dropped session or interrupted service. In LTE, the UE performs downlink measurement periodically based on reference symbols (RS), also referred to as reference signals and Layer 1 and Layer 3 filtering are then applied. Based on the processed measurement, a Layer 3 event evaluation takes place. When the event triggering condition is fulfilled, UE sends the measurement report to source eNB which processes the report and makes handover decision. The handover will be performed if it is approved at source eNB. The first phase of performing handover in LTE is the Handover Preparation which includes the signaling exchange between source eNB and target eNB via an X2 interface and admission control of UE in the target eNB. After UE receiving Handover Command message from source eNB, the second phase Handover Execution begins. During this phase, UE performs Random Access and synchronization to the target eNB. If it succeeds, target eNB will assign the uplink allocation by sending a grant to UE and UE responds with the HO confirm message which indicates the completion of the HO procedure at the radio access network part.

A handover may fail due to the delay of sending the involved signaling messages including the UE measurement report, handover command and handover confirm. In addition, handover may fail when performing random access to the target cell fails.

Common reasons for high handover failure rate may e.g. be coverage limitations or high system load combined with high UE speed. Many of the handover failures occur when a UE transmits measurement report to source eNB. These failures are due to the accentuated resource limitation in the UpLink (UL), i.e. the radio link from the UE to the eNB, or due to coverage limitations. In those "difficult mobility scenarios", the UL signaling message is segmented into several segments and the headers are added which increase the transmission delay and result in the handover failure.

SUMMARY

It is therefore an object of the present invention to provide a mechanism that improves the handover performance.

According to a first aspect of the present invention, the object is achieved by a method in a wireless terminal for sending a measurement report to a serving base station before handover is provided. The wireless terminal and the base station are comprised in a cell in a wireless communications system. The wireless terminal is arranged to use a standard size message or a reduced size message for sending a measurement report before a handover. The wireless terminal obtains information about the cell size and/or the system load. When the cell size exceeds a predetermined value or when the system load exceeds a predetermined value, the wireless terminal sends a measurement report to the base station, using the reduced size message.

According to a second aspect of the present invention, the object is achieved by a method in a base station for handling a measurement report from a wireless terminal before handover. The base station and the wireless terminal are comprised in a cell in a wireless communications system. The base station communicates with the wireless terminal over a radio channel. The base station is arranged to receive from the wireless terminal, a standard size measurement report or a reduced size measurement report before a handover. The base station sends information about the cell size and/or the system load to the wireless terminal. The base station then receives a reduced size measurement report from the wireless terminal. The wireless terminal used the reduced size for the measurement report when the information about the cell size exceeded a predetermined value or when the information about the system load exceeded a predetermined value.

According to a third aspect of the present invention, the object is achieved by an arrangement in a wireless terminal for sending a measurement report to a serving base station before handover. The wireless terminal and the base station are comprised in a cell in a wireless communications system. The wireless terminal is arranged to use a standard size message or a reduced size message for sending a measurement report before a handover. The wireless terminal arrangement comprises an obtaining unit configured to obtain information about the cell size and/or the system load, and when the cell size exceeds a predetermined value or when the system load exceeds a predetermined value. The wireless terminal arrangement further comprises a sending unit configured to send a measurement report to the base station, using the reduced size message.

According to a fourth aspect of the present invention, the object is achieved by an arrangement in a base station for handling a measurement report from a wireless terminal before handover. The base station and the wireless terminal are comprised in a cell in a wireless communications system. The base station is arranged to communicate with the wireless terminal over a radio channel. The base station is arranged to receive from the wireless terminal, a standard size measurement report or a reduced size measurement report before a handover. The base station arrangement comprises a sending unit configured to send information about the cell size and/or the system load to the wireless terminal. The base station arrangement further comprises a receiving unit configured to receive a reduced size measurement report from the wireless terminal. The wireless terminal is arranged to use the reduced size for the measurement report when the information about the cell size exceeds a predetermined value or when the information about the system load exceeds a predetermined value.

The wireless terminal sends a measurement report to the base station, using the reduced size message, when the cell size exceeds a predetermined value or when the system load exceeds a predetermined value. Since the message size is reduced, the handover failure rate due to resource limitations is decreased which in turn implies that the handover performance is improved.

Advantages of the present solution are a more efficient usage of radio resources and an improved handover performance in terms of handover failures.

An advantage of the present solution is that it is applicable not only for inter-frequency handovers, but also for intra-frequency handovers.

A further advantage of the present invention is that it makes the transmission of measurement report more robust through the link to the serving cell which is usually bad when performing handover.

A further advantage of the present invention is that the interruption time due to handover in user plane is not increased.

A further advantage of the present invention is that it can further decrease the interruption time to some extent.

BRIEF DESCRIPTION OF THE DRAWINGS

The invention is described in more detail with reference to attached drawings illustrating exemplary embodiments of the invention and in which.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
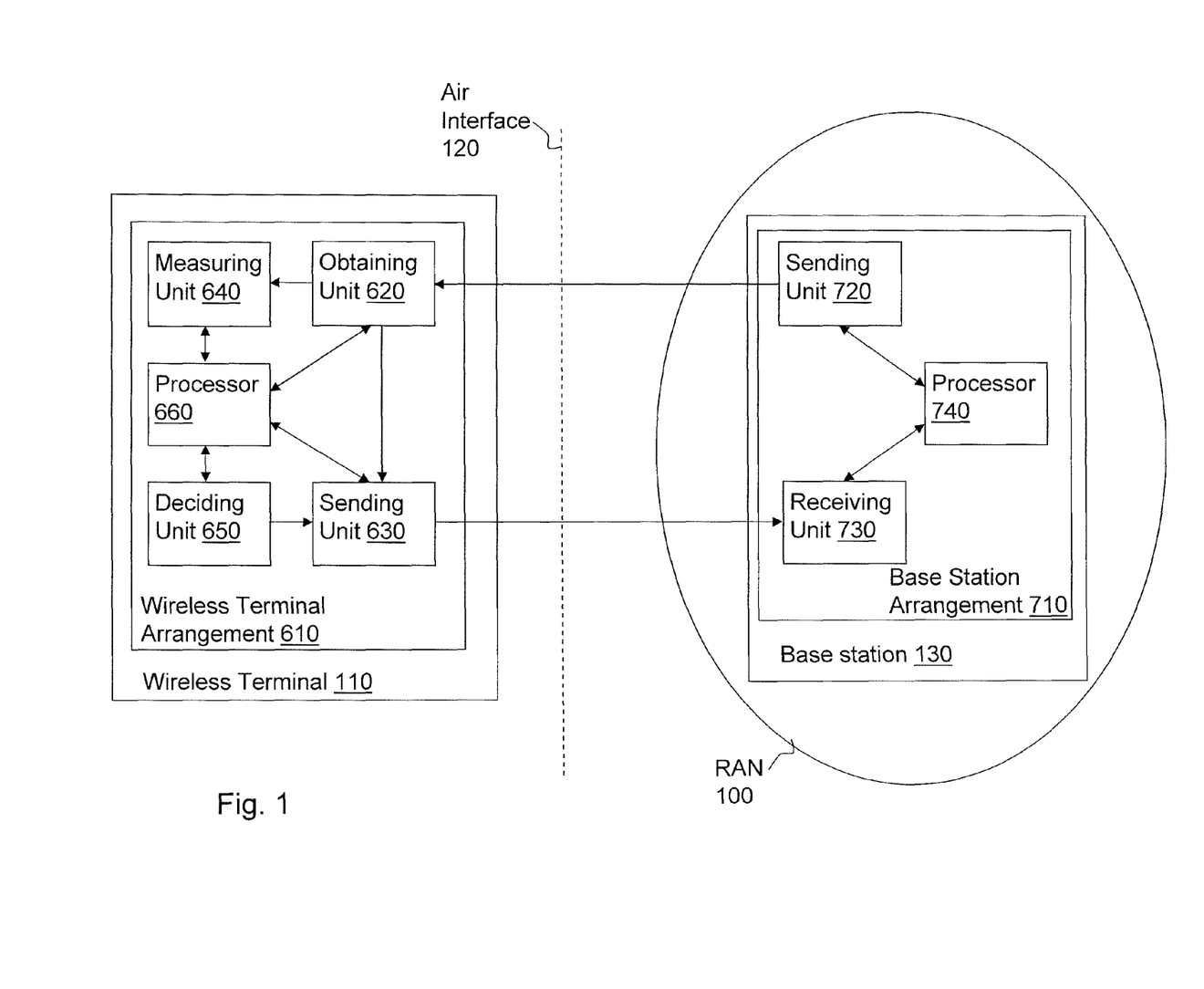
FIG. 1 is a schematic block diagram illustrating embodiments of a wireless telecommunication system wherein a wireless terminal communicates with a base station in a radio access network.

FIG. 1 shows an exemplary radio access network (RAN) 100 in a wireless communications system, with which RAN a user equipment unit, from now on referred to as the wireless terminal 110, communicates over an air interface 120. The radio access network 100 covers a geographical area which is divided into cell areas, with each cell area being served by a network node such as a base station 130 shown in FIG. 1. The base station 130 is also referred to as a source base station. The base station 130 is a Radio Base Station, which also may be referred to as NodeB, B node, eNodeB or eNB, evolved NodeB, or an access point. The wireless terminal 110, the base station 130 and the radio access network b100 are comprised in the wireless communication system.

The radio access network 100 and the wireless terminal 110 are comprised in a wireless telecommunication system, such as e.g. the E-UTRAN, LTE, LTE-Adv, 3rd Generation Partnership Project (3GPP) WCDMA system, Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB). The wireless terminal 110 may be a mobile station or user equipment units such as mobile telephones also known as a "cellular" telephone, and a laptop with wireless capability, e.g., mobile termination, and thus can be, for example, portable, pocket, hand-held, computer-included, or a car-mounted mobile device which communicate voice and/or data with radio access network.

The basic idea of the present solution is to adapt the size of measurement report by reducing its size for those scenarios with larger cell size and/or high system load. To implement the adaptive algorithm, the network may broadcast or signal the existence of the suggested feature in certain cells, where the feature is supported. In addition, up link (UL) load indications in those cells may be broadcasted.

Adapting the Measurement Report Size According to a Scenario

In the handover algorithm, a measurement report including several candidate cells for handover is sent by the wireless terminal 110 to the serving base station 130, i.e. the source base station. The base station 130 then makes a handover decision based on the report and set the target cell based on the reported measurements on these cells.

However, in a "difficult mobility scenario" where the wireless terminal 110 is in a cell with a cell size that is large and/or wherein the load in the wireless communication system is high, it is not required for the wireless terminal 110 to report all the candidate cells to the base station 130. Therefore, instead of reporting measurements on a plurality of cells, e.g. two to four cells, only the cell with the best measurement is reported to the serving base station 130 which reduces the size of the measurement report.

Furthermore compression mechanisms for Medium Access Control (MAC), Radio Link Control (RLC) headers may be conceived, or even their partial elimination in these cases, so as to reduce the measurement report size.

Within this document the cell size being large or the system load being high means that cell size exceeds a predetermined threshold value such as 500-2000 m. e.g. 1500 m., however, the threshold value may both less or more than 500-2000 m., or the system load exceeds a predetermined threshold value such as 60%-95%, e.g. 80% usage of the resource, however, the threshold value may both less or more than 60%-95%, e.g. 80% usage of the resource. The threshold values may be up to the system to decide.

On the other hand, if the cell size is small and system is low, the handover can have a good performance even with large measurement report size because the link quality to the serving base station 130 is good. Moreover, in these scenarios, it is very likely that more than one cell can trigger the handover simultaneously. So it is required to send the measurement report to these more than one cells, and in this scenario the source base station 130 makes the decision to which cell the wireless terminal 110 shall be handed over and performs the admission control. Hence the standard size of the measurement report may preferably be implemented in these "handover friendly scenarios". A standard size of measurement report may comprise Radio Resource Control (RRC) Measurement report with MAC, RLC and Packet Data Convergence Protocol (PDCP) headers. The RRC Measurement report commonly comprises 2-4 reported target cells.

Figure 2:
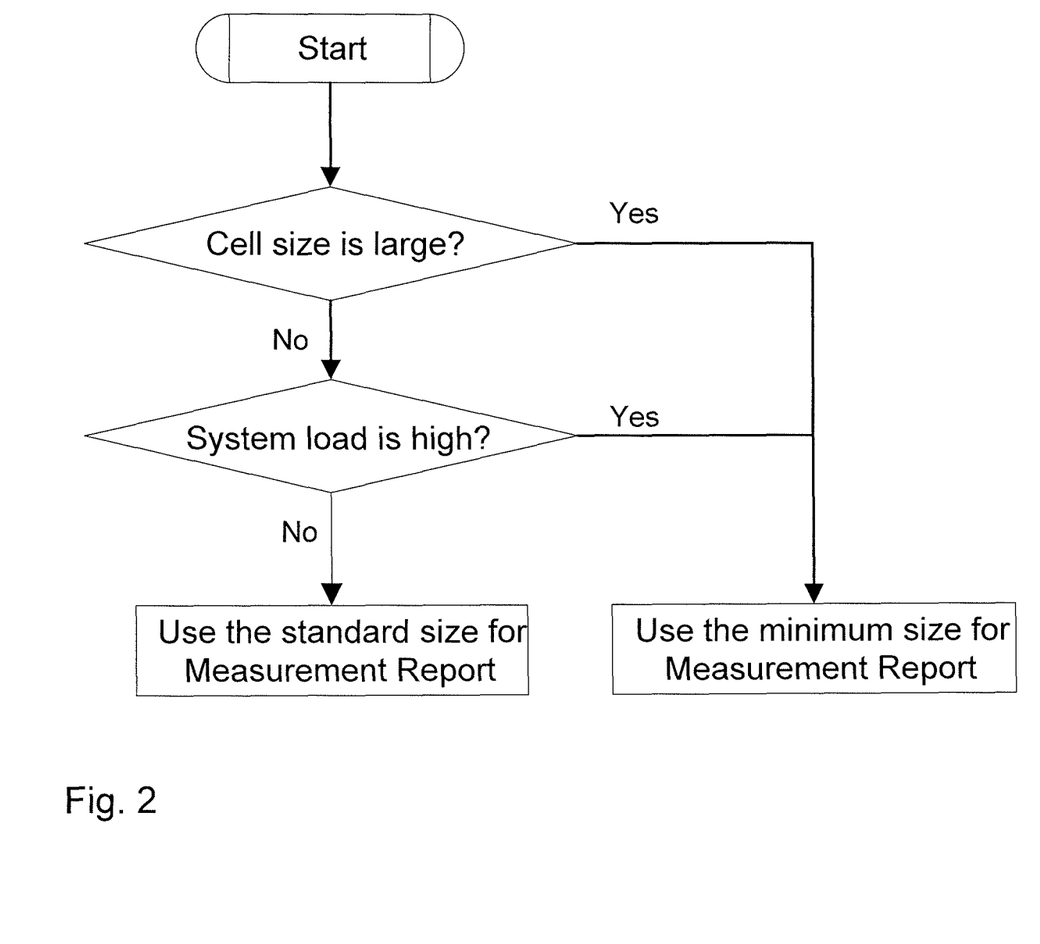
FIG. 2 is a flow chart illustrating embodiments of a method in a wireless terminal.

FIG. 2 is a flowchart depicting a method according to the general concept of adapting the size. The method comprises the following steps. If the cell size is large, use reduced size for measurement report. If the system load is high, use reduced size for measurement report. In other cases use the standard size for measurement report. This may be performed in the mobile terminal 110.

In order to adapt the size of measurement report, wireless terminal 110 needs to know the required elements that support this feature. The wireless terminal 110 requires an indication on the load of the system and/or an indication of the cell size, or at least if the cell is large or not. This may e.g. be implemented in two different ways:

Network Broadcasting

In the cells where the suggested feature is supported, the cell size and system load may be broadcasted by the base station 130 to all the wireless terminals within the cell including the wireless terminal 110. The wireless terminal 110 decides the size of measurement report based on this information according. The method may be performed by the radio access network 100 via the base station 130 according to the following steps. If the cell size is large, broadcast to the wireless terminals within the cell including the wireless terminal 110, that reduced size shall be used for measurement reports. If the system load is high, broadcast to the wireless terminals within the cell including the wireless terminal 110, that reduced size shall be used for measurement reports. If the wireless terminal 110 does not receive any information to use reduced size for measurement reports, the standard size for measurement report shall be used, or in some embodiments the base station 130 may broadcast to the wireless terminals within the cell including the wireless terminal 110 information that reduced size for measurement reports shall be used.

Explicit Signaling

The implementation method may be alternatively developed by using explicit signaling to the wireless terminal 110. In this case, it will be more flexible to implement the invention. Two methods, one illustrated by the flowchart depicted in FIG. 4 and one illustrated by the flowchart in FIG. 5 may be implemented.

Figure 3:
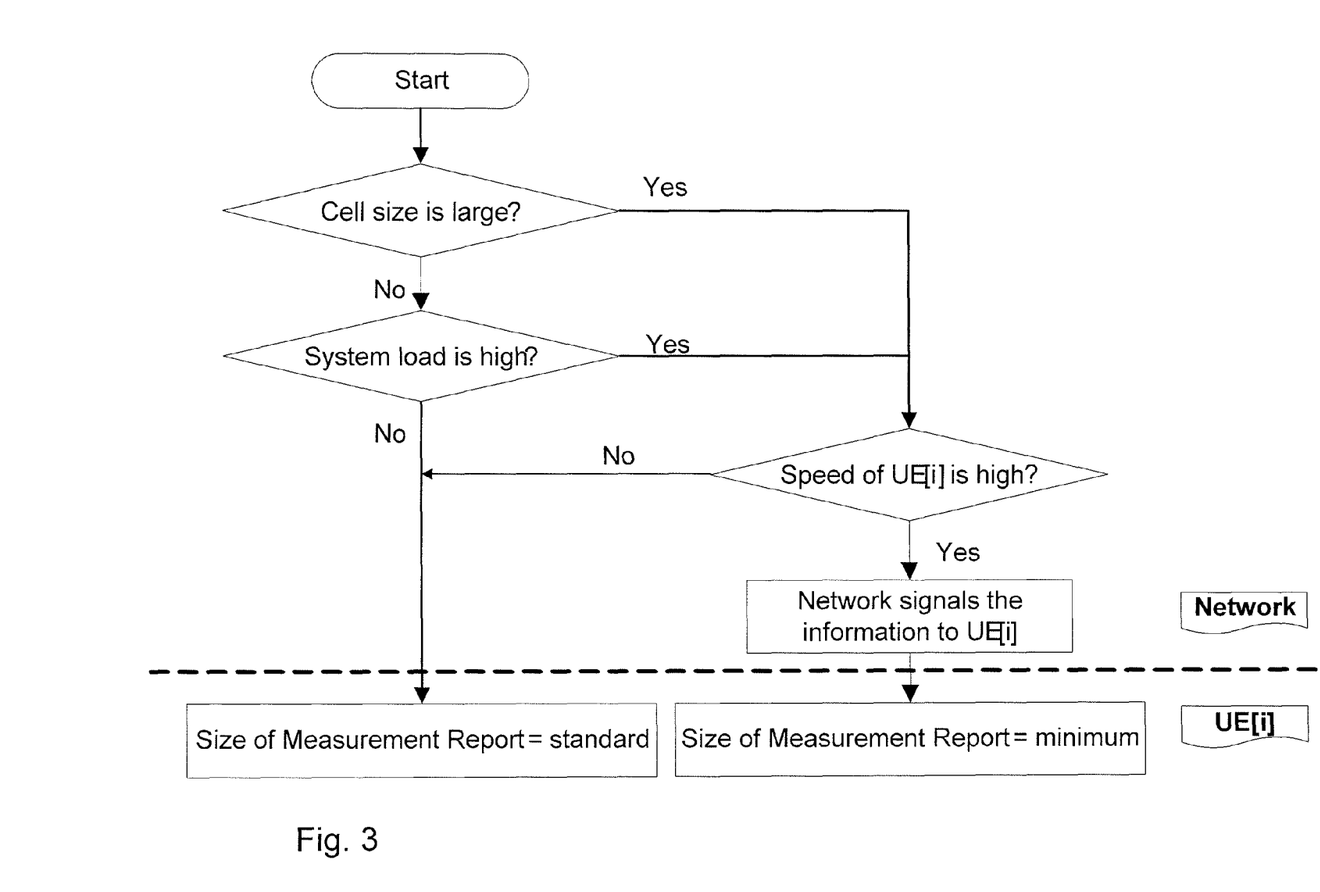
FIG. 3 is a flow chart illustrating embodiments of a method in a wireless communication system.

Referring to FIG. 3, when the wireless terminal 110 is in a large and/or heavy load cells and in some embodiments when the wireless terminal 110 moves fast, the network signals this information via the base station 130 to the wireless terminal 110, which information tells that reduced size shall be used for reporting measurement.

The method may be performed by the radio access network 100 via the base station 130 according to the following steps. If the cell size is large, signal to the wireless terminal 110, that reduced size shall be used for measurement reports. If the system load is high, signal to the wireless terminal 110, that reduced size shall be used for measurement reports. If the wireless terminal 110 does not receive any information to use reduced size for measurement reports, the standard size for measurement report shall be used, or in some embodiments the base station 130 may signal to the wireless terminal 110 information that standard size for measurement reports shall be used. According to some embodiments, the decision weather to use standard or reduced size of the measurement report may also be based on the speed of the wireless terminal 110, such that if the cell size is large or the system load is high, but the speed of the wireless terminal is below a predetermined threshold value such as e.g. 2-40 km/h, e.g. 3 km/h, however, the threshold value may both less or more than 2-40 km/h, which may be up to the system to decide. The base station 130 may signal to the wireless terminal 110 information that standard size for measurement reports shall be used, or alternatively, the base station 130 may omit to signal to the wireless terminal 110 information that reduced size for measurement reports shall be used. In the latter case any omitted information that reduced size for measurement reports shall be used will be interpreted such that the standard size of measurement reports shall be used by the wireless terminal 110.

Figure 4:
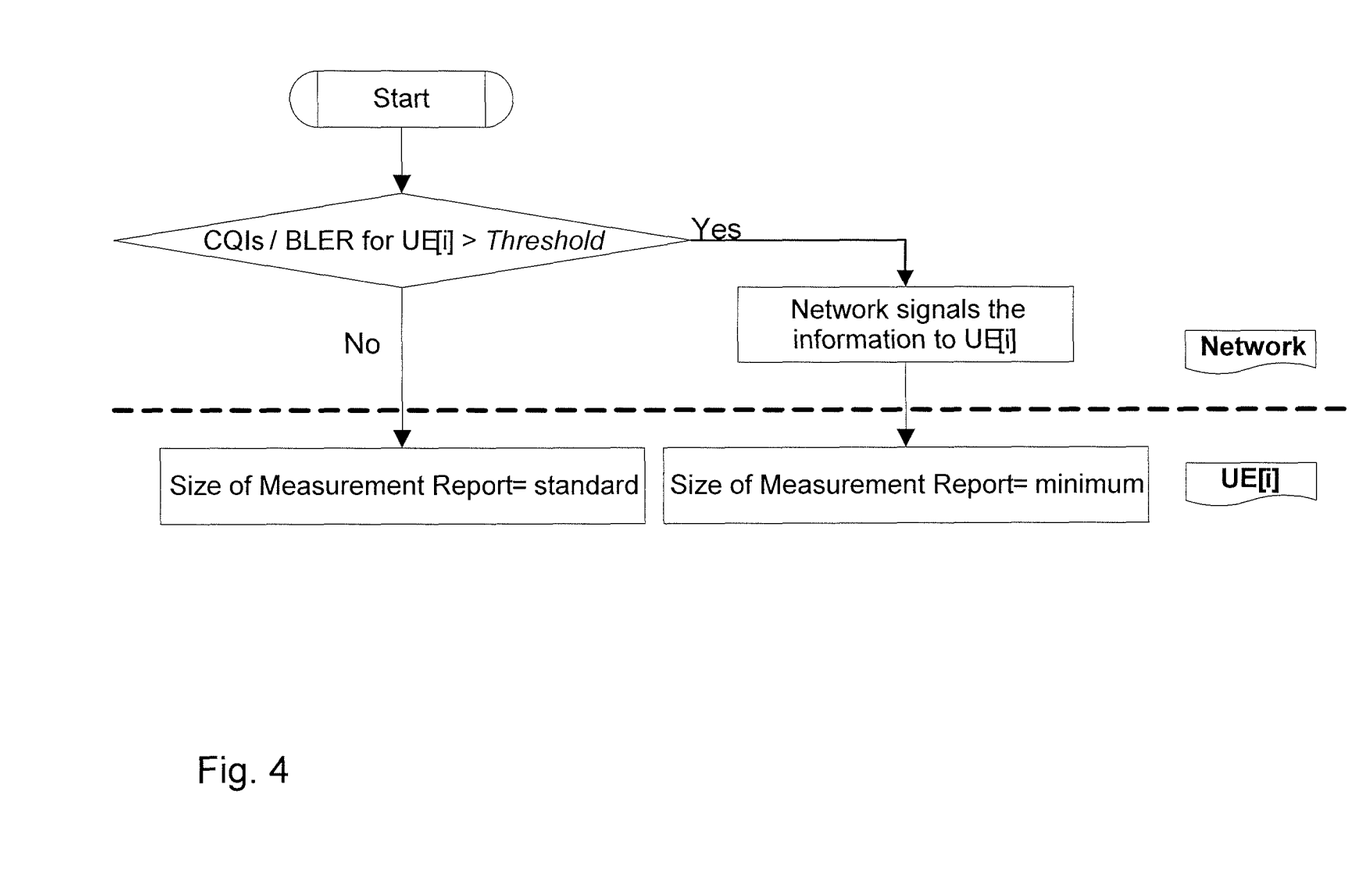
FIG. 4 is a flow chart illustrating embodiments of a method in a wireless communication system.

FIG. 4 is flowchart illustrating a method according to some embodiments. This method may be combined with any embodiment described above and be implemented as an extra step into the method described with reference to FIG. 3. The method may be performed by the radio access network 100 via the base station 130 according to the following steps. When the network has detected that that the channel condition is not good enough indicated by e.g. that the Channel Quality Indications (CQIs) or that the uplink Block Error Rate (BLER) for the wireless terminal 110 is above a certain threshold, the radio access network 100 signals the information to the wireless terminal 110 via the base station 130. The wireless terminal 110 will then use the reduced size for measurement report.

Information about the uplink load in the cell may be obtained by the wireless terminal 110. The base station 130 measures the uplink interference power or the usage of resource blocks. This information may also be broadcasted to the wireless terminal 110 by the base station 130 in the cell.

Figure 5:
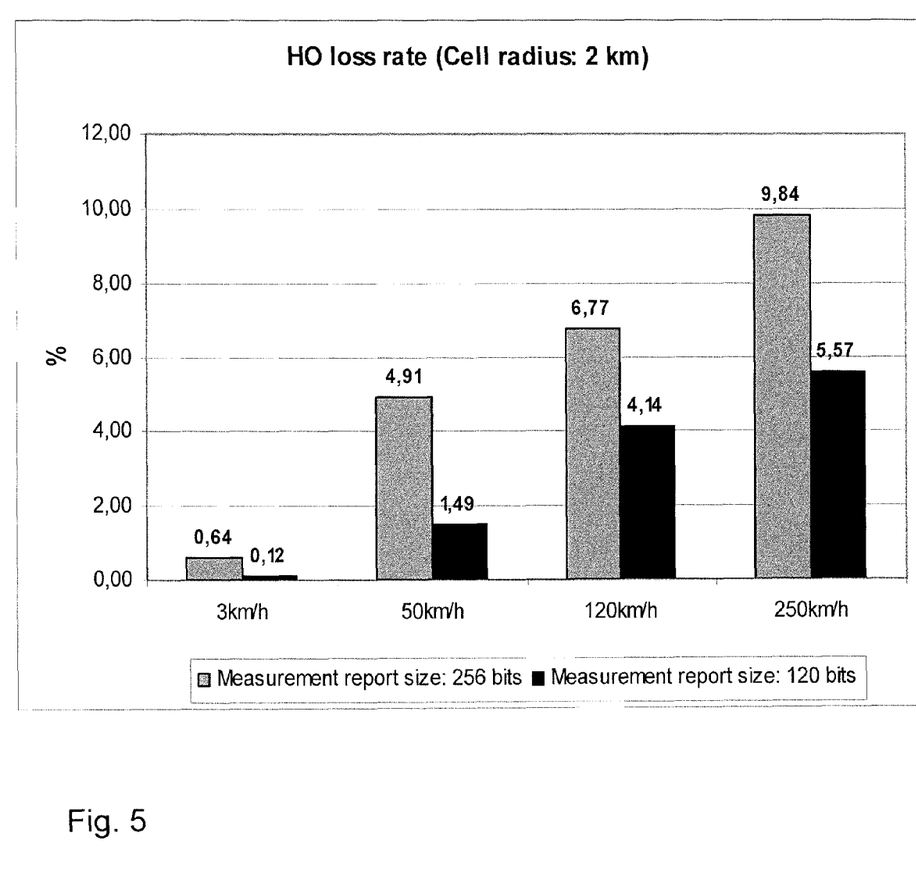
FIG. 5 is a diagram illustrating handover loss rate in a wireless communication system.

The benefits of the present solution are more efficient usage of radio resources and the improved handover performance in terms of handover failures. An example is shown in the diagram in FIG. 5 depicting the handover loss rate in percent for a cell radius of 2 km and for different speeds of the wireless terminal 110. It can be seen that the handover failure rate decreases significantly by reducing the measurement report size from 256 bits to 120 bits (the numbers are used as examples). The gain can be even higher with further reduction of the report size.

Figure 6:
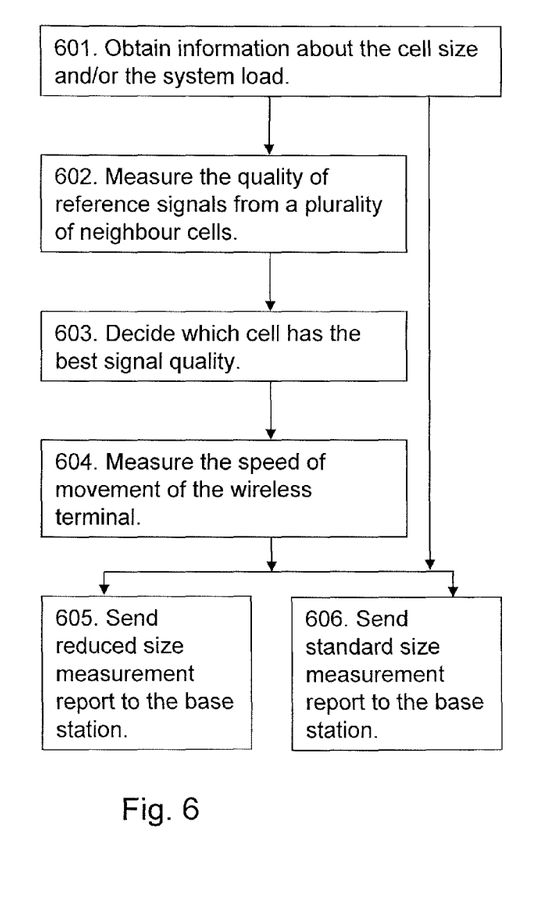
FIG. 6 is a flow chart illustrating embodiments of a method in a wireless terminal.

The method steps in the wireless terminal 110, for sending a measurement report to a serving base station 130 before handover, according to some embodiments, will now be described with reference to a flowchart depicted in FIG. 6. As mentioned above the wireless terminal 110 and the base station 130 are comprised in a cell in a wireless communications system. The wireless terminal 110 is arranged to use a standard size message or a reduced size message for sending a measurement report before a handover. The method comprising the steps of:

Step 601

The wireless terminal 110 obtains information about the cell size and/or the system load.

In some embodiments, the obtained information about the cell size and/or the system load is received from the base station 130.

In some embodiments, the obtained information about the system load is obtained by measuring the uplink interference power or the usage of resource blocks.

Step 602

This is an optional step. The wireless terminal 110 may measure the quality of reference signals from a plurality of neighbour cells. The plurality of neighbour cells is candidate cells for handover.

Step 603

This is an optional step. The wireless terminal 110 may decide which cell of the plurality of cells that has the signal with the best signal quality based on the measurement.

Step 604

This is an optional step. The wireless terminal 110 may measure the speed of movement of the wireless terminal 110.

Step 605

When the cell size exceeds a predetermined value or when the system load exceeds a predetermined value, the wireless terminal 110 sends a measurement report to the base station 130, using the reduced size message.

In some embodiments, this step further is performed when the channel condition exceeds a predetermined value. The channel condition may be represented by the Channel Quality Indication (CQIs) or the uplink Block Error Rate (BLER) for the wireless terminal 110.

Step 606

This is an optional step. When the cell size exceeds a predetermined value or when the system load exceeds a predetermined value, or when the channel condition exceeds a predetermined value, but the speed of the wireless terminal 110 is below a predetermined threshold value, the wireless terminal 110 sends a measurement report to the base station 130, using the standard size message.

In the case when the conditions for sending a measurement report to the base station 130, using the reduced size message, as mentioned above, is not fulfilled, the wireless terminal 110 sends a measurement report to the base station 130 using the standard size message.

In some embodiments, the reduced size message is represented by a message comprising a measurement report associated only to the cell with the best signal quality.

In some embodiments, the reduced size message is represented by a standardized message with a partial elimination of the header of the message.

To perform the method steps above for sending a measurement report to a serving base station (130) before handover, the wireless terminal 110 comprises an arrangement 610 which is shown in FIG. 1. As mentioned above, the wireless terminal 110 and the base station 130 are comprised in a cell in a wireless communications system. The wireless terminal 110 is arranged to use a standard size message or a reduced size message for sending a measurement report before a handover.

The wireless terminal arrangement 610 comprises an obtaining unit 620 configured to obtain information about the cell size and/or the system load.

In some embodiments, the obtaining unit 620 further is configured to receive the information about the cell size and/or the system load from the base station 130.

The obtaining unit 620 may further be configured to obtain the information about the system load by measuring the uplink interference power or the usage of resource blocks.

Reduced Size Message

The wireless terminal arrangement 610 comprises a sending unit 630 configured to send a measurement report to the base station 130, using the reduced size message when the cell size exceeds a predetermined value or when the system load exceeds a predetermined value.

The sending unit 630 may further be configured to send a measurement report to the base station 130, using the reduced size message when the channel condition exceeds a predetermined value. In some embodiments, the channel condition is represented by the Channel Quality Indication (CQIs) or the uplink Block Error Rate (BLER) for the wireless terminal 110.

In some embodiments the reduced size message is represented by message comprising a measurement report associated only to the cell with the best signal quality.

In some embodiments, the reduced size message is represented by a standardized message with a partial elimination of the header of the message.

Standard Size Message

In some embodiments, the sending unit 630 further is configured to send a measurement report to the base station 130, using the standard size message when the cell size exceeds a predetermined value, or when the system load exceeds a predetermined value, or when the channel condition exceeds a predetermined value, but the speed of the wireless terminal 110 is below a predetermined threshold value.

In some embodiments, the sending unit 630 further is configured to send a measurement report to the base station 130 using the standard size message, when the conditions for sending a measurement report to the base station 130 using the reduced size message is not fulfilled.

The wireless terminal arrangement 610 may further comprise a measuring unit 640 configured to measure the speed of movement of the wireless terminal 110.

In some embodiments, the measuring unit 640 may further be configured to measure the quality of reference signals from a plurality of neighbour cells. The plurality of neighbour cells is candidate cells for handover.

The wireless terminal arrangement 610 may further comprise a deciding unit 650 configured to decide which cell of the plurality of cells that has the signal with the best signal quality based on the measurement.

Figure 7:
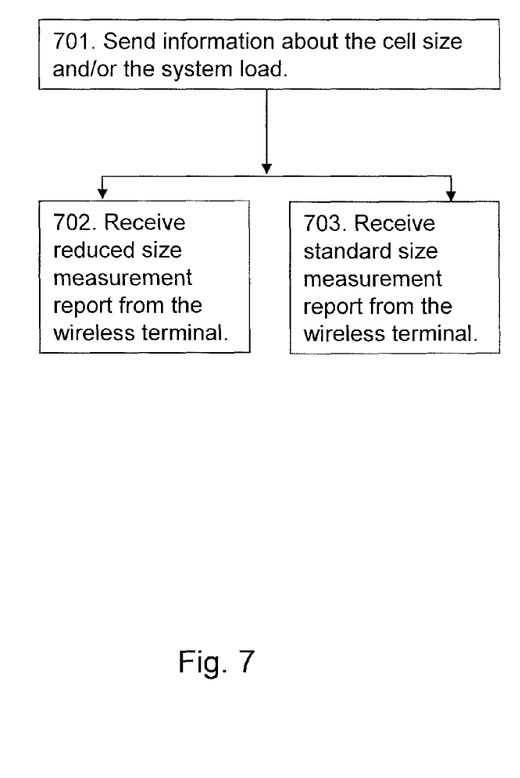
FIG. 7 is a flow chart illustrating embodiments of a method in a base station.

The method steps in the base station 130 for handling a measurement report from a wireless terminal 110 before handover, according to some embodiments will now be described with reference to a flowchart depicted in FIG. 7. As mentioned above, the base station 130 and the wireless terminal 110 are comprised in a cell in a wireless communications system. The base station 130 communicates with the wireless terminal 110 over a radio channel. The base station 130 is arranged to receive from the wireless terminal 110, a standard size measurement report or a reduced size measurement report before a handover. The method comprises the steps of:

Step 701

The base station 130 sends information about the cell size and/or the system load to the wireless terminal 110. This may be performed via a broadcast channel or a dedicated channel.

Step 702

The base station 130 receives a reduced size measurement report from the wireless terminal 110. The wireless terminal 110 used the reduced size for the measurement report when the information about the cell size exceeded a predetermined value or when the information about the system load exceeded a predetermined value.

The reduced size measurement report may further be received from the wireless terminal 110 when the wireless terminal 110 obtained information that the radio channel condition exceeded a predetermined value. The channel condition may e.g. be represented by the Channel Quality Indication (CQIs) or the uplink Block Error Rate (BLER) for the wireless terminal 110.

In some embodiments, the reduced size message is represented by a message comprising a measurement report associated only to the cell with the best signal quality. The wireless terminal 110 may have measured the quality of reference signals from a plurality of neighbour cells. The pluralities of neighbour cells are candidate cells for handover. The wireless terminal 110 may have decided which cell of the plurality of cells that has the best signal quality based on the measurement.

In some embodiments, the reduced size message is represented by a standardized 10 message with a partial elimination of the header of the message.

Step 703

This is an optional step. The base station 130 may receive a standard size measurement report from the wireless terminal 110. The wireless terminal 110 used the standard size for the measurement report when the cell size exceeds a predetermined value, or when the system load exceeds a predetermined value, or when the channel condition exceeds a predetermined value, but the speed of the wireless terminal 110 is below a predetermined threshold value.

In some embodiments, the base station 130 receives a standard size measurement report from the wireless terminal 110, since the wireless terminal 110 used the standard size for the measurement report also in the cases when the conditions for sending a measurement report to the base station 130 using the reduced size message, is not fulfilled.

To perform the method steps above for handling a measurement report from a wireless terminal 110 before handover, the base station 130 comprises an arrangement 710 shown in FIG. 1. As mentioned above, the base station 130 and the wireless terminal 110 are comprised in a cell in a wireless communications system. The base station 130 is arranged to communicate with the wireless terminal 110 over a radio channel. The base station 130 is arranged to receive from the wireless terminal 110 a standard size measurement report or a reduced size measurement report before a handover.

The base station arrangement 710 comprises a sending unit 720 configured to send information about the cell size and/or the system load to the wireless terminal 110

Reduced Size Measurement Report

The base station arrangement 710 further comprises a receiving unit 730 configured to receive a reduced size measurement report from the wireless terminal 110. The wireless terminal 110 is arranged to use the reduced size for the measurement report when the information about the cell size exceeds a predetermined value or when the information about the system load exceeds a predetermined value.

The receiving unit 730 may further be configured to receive the reduced size measurement report from the wireless terminal 110, when the wireless terminal 110 obtained information that the radio channel condition exceeded a predetermined value.

In some embodiments, the channel condition is represented by the Channel Quality Indication (CQIs) or the uplink Block Error Rate (BLER) for the wireless terminal 110.

The reduced size message may be represented by a message comprising a measurement report associated only to the cell with the best signal quality. The wireless terminal 110 is in this case arranged to measure the quality of reference signals from a plurality of neighbour cells. The plurality of neighbour cells is candidate cells for handover. The wireless terminal 110 is in this case arranged to decide which cell of the plurality of cells that has the best signal quality based on the measurement.

The reduced size message may be also represented by a standardized message with a partial elimination of the header of the message.

Standard Size Measurement Report

The receiving unit 730 may further be configured to receive a standard size measurement report from the wireless terminal 110. The wireless terminal 110 is in this case arranged to use the standard size for the measurement report when the cell size exceeds a predetermined value, or when the system load exceeds a predetermined value, or when the channel condition exceeds a predetermined value, but the speed of the wireless terminal 110 is below a predetermined threshold value.

According to some embodiments, the receiving unit 730 is further configured to receive the standard size measurement report from the wireless terminal 110, in a case when the conditions for sending a measurement report from the wireless terminal 110 to the base station 130, using the reduced size message is not fulfilled.

The present mechanism for handling a measurement report from a wireless terminal 110 to a base station 130 before handover, may be implemented through one or more processors, such as a processor 660 in the wireless terminal 110 or the processor 740 in the base station 130 depicted in FIG. 1, together with computer program code for performing the functions of the present solution. The program code mentioned above may also be provided as a computer program product, for instance in the form of a data carrier carrying computer program code for performing the present solution when being loaded into the base station 130 or the wireless terminal 110. One such carrier may be in the form of a CD ROM disc. It is however feasible with other data carriers such as a memory stick. The computer program code can furthermore be provided as pure program code on a server and downloaded to the base station 130 or the wireless terminal 110 remotely.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method in a wireless terminal for sending a measurement report to a serving base station before handover, the method comprising:
   obtaining, by the wireless terminal, information about a cell size and/or a wireless communication system load, the wireless terminal being configured to use a standard size message or a reduced size message when sending a measurement report to the serving base station, the wireless terminal and the base station being comprised in a cell in a wireless communication system; and
   when the cell size exceeds a predetermined cell size value or when the system load exceeds a predetermined load value, sending, by the wireless terminal, a measurement report to the base station, using the reduced size message.

2. The method according to claim 1, wherein the wireless terminal sends the measurement report to the base station using the reduced size message also if a channel condition exceeds a predetermined value.

3. The method according to claim 2, wherein the channel condition is represented by a Channel Quality Indication (CQIs) or an uplink Block Error Rate (BLER) for the wireless terminal.

4. The method according to claim 1, further comprising:
   when the cell size exceeds the predetermined cell size value or when the system load exceeds the predetermined load value, or when a channel condition exceeds a predetermined value, but a speed of the wireless terminal is below a predetermined threshold value, sending, by the wireless terminal, the measurement report to the base station using the standard size message.

5. The method according to claim 1, further comprising:
   measuring, by the wireless terminal, a speed of movement of the wireless terminal.

6. The method according to claim 1, further comprising:
   when none of conditions for sending the measurement report to the base station using the reduced size message is fulfilled, sending, by the wireless terminal, the measurement report to the base station using the standard size message,
   wherein the conditions include the cell size exceeding the predetermined cell size value and the system load exceeding the predetermined load value.

7. The method according to claim 1, further comprising:
   measuring, by the wireless terminal, a quality of reference signals received from neighbour cells, which are candidate cells for handover, deciding which cell of the measured neighbour cells provides, to the wireless terminal, the reference signal with the best signal quality based on the measuring, and wherein the reduced size message includes only information related to the cell with the best signal quality.

8. The method according to claim 1, wherein the reduced size message is a standard size message with a partial elimination of a header of the standard size message.

9. The method according to claim 1, wherein the obtained information about the cell size and/or the system load is received by the wireless terminal from the base station via a broadcast channel or a dedicated channel.

10. A method in a base station for handling a measurement report from a wireless terminal before handover, the method comprising:

sending, by the base station, information about a cell size and/or a system load to the wireless terminal that is configured to send a standard size measurement report or a reduced size measurement report to the base station, the wireless terminal and the base station being comprised in a cell in a wireless communication system; and receiving the reduced size measurement report from the wireless terminal, when the cell size exceeded a predetermined cell size value or when the system load exceeded a predetermined load value.

11. The method according to claim 10, wherein the reduced size measurement report is received from the wireless terminal also when the wireless terminal obtained information that a radio channel condition exceeded a predetermined value.

12. The method according to claim 11, wherein the channel condition is represented by a Channel Quality Indication (CQIs) or an uplink Block Error Rate (BLER) for the wireless terminal.

13. The method according to claim 10, further comprising:

receiving the standard size measurement report from the wireless terminal, when the cell size exceeds the predetermined cell size value, or when the system load exceeds the predetermined load value, or when a channel condition exceeds a predetermined value, but a speed of the wireless terminal is below a predetermined threshold value.

14. The method according to claim 10, further comprising:

receiving the standard size measurement report from the wireless terminal when none of conditions for sending the reduced size measurement report to the base station is fulfilled, the conditions including the cell size exceeding the predetermined cell size value and the system load exceeding the predetermined load value.

15. The method according to claim 10, wherein the reduced size measurement report includes only information related to a cell among measured neighbour cells with the best signal quality, wherein the wireless terminal measured a quality of reference signals received from neighbour cells, which are candidate cells for handover, and decided which is the cell that provides, to the wireless terminal, the reference signal with the best signal quality based on measurements.

16. The method according to claim 10, wherein the reduced size measurement report is the standard size measurement report with a partial elimination of a header of the standard size measurement report.

17. A wireless terminal arrangement for sending a measurement report to a serving base station before handover, the wireless terminal arrangement comprising:

an obtaining unit configured to obtain information about a cell size and/or a system load; and a sending unit configured to send a measurement report to the base station using a standard size message or a reduced size message, the sending unit using the reduced size message to send the measurement report when the cell size exceeds a predetermined cell size value or when the system load exceeds a predetermined load value, wherein the wireless terminal arrangement and the base station are in a cell of a wireless communications system.

18. The wireless terminal arrangement according to claim 17, wherein the sending unit is further is-configured to send the measurement report to the base station using the reduced size message when a channel condition exceeds a predetermined value.

19. The wireless terminal arrangement according to claim 18, wherein the channel condition is represented by a Channel Quality Indication (CQIs) or an uplink Block Error Rate (BLER) for the wireless terminal.

20. The wireless terminal arrangement according to claim 17, wherein the sending unit is further is-configured to send the measurement report to the base station using the standard size message when the cell size exceeds the predetermined cell size value, or when the system load exceeds the predetermined load value, or when a channel condition exceeds a predetermined value, but a speed of the wireless terminal is below a predetermined threshold value.

21. The wireless terminal arrangement according to claim 17, further comprising:

a measuring unit configured to measure a speed of movement of the wireless terminal arrangement.

22. The wireless terminal arrangement according to claim 17, wherein the sending unit is further configured to send the measurement report to the base station using the standard size message, when none of conditions for sending a the measurement report to the base station using the reduced size message is fulfilled, the conditions including the cell size exceeding a predetermined cell size value and the system load exceeding the predetermined load value.

23. The wireless terminal arrangement according to claim 21, wherein the measuring unit is further configured to measure a quality of reference signals received from neighbour cells, which are candidate cells for handover, a deciding unit configured to decide which cell of the measured neighbour cells provides, to the wireless terminal arrangement, the reference signal with the best signal quality based on measurements performed by the measuring unit, and wherein the reduced size message includes only information related to the cell with the best signal quality.

24. The wireless terminal arrangement according to claim 17, wherein the reduced size message is the standard size message with a partial elimination of a header of the standard size message.

25. The wireless terminal arrangement according to claim 17, wherein the obtaining unit further is configured to receive the information about the cell size and/or the system load from the base station.

26. A base station arrangement for handling a measurement report from a wireless terminal before handover, the base station arrangement comprising:

a sending unit configured to send information about a cell size and/or a system load to the wireless terminal; and a receiving unit configured to receive a reduced size measurement report from the wireless terminal when the cell size exceeds a predetermined cell size value or when the system load exceeds a predetermined load value, wherein the wireless terminal and the base station arrangement are in a cell in a wireless communication system, and the base station arrangement is configured to receive, from the wireless terminal, a standard size measurement report or the reduced size measurement report before handover.

27. The base station arrangement according to claim 26, wherein the receiving unit is further configured to receive the reduced size measurement report from the wireless terminal when the wireless terminal obtained information that a radio channel condition exceeded a predetermined value.

28. The base station arrangement according to claim 27, wherein the channel condition is represented by a Channel Quality Indication (CQIs) or an uplink Block Error Rate (BLER) for the wireless terminal.

29. The base station arrangement according to claim 26, wherein the receiving unit is further configured to receive the standard size measurement report from the wireless terminal, when the cell size exceeds the predetermined cell size value, or when the system load exceeds the predetermined load value, or when a channel condition exceeds a predetermined value, but a speed of the wireless terminal is below a predetermined threshold value.

30. The base station arrangement according to claim 26, wherein the receiving unit is further configured to receive the standard size measurement report from the wireless terminal, if none of conditions for sending the reduced size measurement report from the wireless terminal to the base station is fulfilled, wherein the conditions include the cell size exceeding the predetermined cell size value and the system load exceeding the predetermined load value.

31. The base station arrangement according to claim 26, wherein the reduced size measurement report includes only information related to a cell among measured neighbour cells with the best signal quality, wherein the wireless terminal is arranged to measure a quality of reference signals received from the neighbour cells, which are candidate cells for handover, and to decide which is the cell that provides, to the wireless terminal, the reference signal with the best signal quality based on measurements.

32. The base station arrangement according to claim 26, wherein the reduced size measurement report is represented by the standard size measurement report with a partial elimination of a header of the standard size measurement report.

* * * * *

UNITED STATES PATENT AND TRADEMARK OFFICE
CERTIFICATE OF CORRECTION

PATENT NO. : 8,948,759 B2  Page 1 of 1
APPLICATION NO. : 13/255028
DATED : February 3, 2015
INVENTOR(S) : Dimou et al.

It is certified that error appears in the above-identified patent and that said Letters Patent is hereby corrected as shown below:

In the Specification

In Column 7, Line 48, delete "weather" and insert -- whether --, therefor.

In Column 9, Lines 32-33, delete "further is configured" and insert -- is further configured --, therefor.

In Column 9, Lines 58-59, delete "further is configured" and insert -- is further configured --, therefor.

In Column 9, Lines 65-66, delete "further is configured" and insert -- is further configured --, therefor.

In Column 10, Line 53, delete "standardized 10" and insert -- standardized --, therefor.

In the Claims

In Column 14, Line 9, in Claim 18, delete "is-configured" and insert -- configured --, therefor.

In Column 14, Line 18, in Claim 20, delete "is-configured" and insert -- configured --, therefor.

In Column 14, Line 32, in Claim 22, delete "a the" and insert -- the --, therefor.

In Column 14, Line 53, in Claim 25, delete "further is configured" and insert -- is further configured --, therefor.

Signed and Sealed this
Fourteenth Day of July, 2015

Michelle K. Lee
*Director of the United States Patent and Trademark Office*